United States Patent [19]

Sato

[11] Patent Number: 4,753,083

[45] Date of Patent: Jun. 28, 1988

[54] DEVICE FOR CONTROLLING THE CAPACITY OF A VARIABLE CAPACITY COMPRESSOR

[75] Inventor: Motoharu Sato, Honjo, Japan

[73] Assignee: Sanden Corporation, Gunma, Japan

[21] Appl. No.: 12,144

[22] Filed: Feb. 9, 1987

[30] Foreign Application Priority Data

Feb. 7, 1986 [JP] Japan ................... 61-24217

[51] Int. Cl.$^4$ ............................... F25B 1/00
[52] U.S. Cl. .................... 62/209; 62/228.5; 236/91 F
[58] Field of Search ............. 236/91 F; 62/228.4, 62/228.5, 209, 229; 165/43; 98/2.01

[56] References Cited

U.S. PATENT DOCUMENTS

| 4,102,150 | 7/1978 | Kountz . | |
| 4,326,386 | 4/1982 | Tamura . | |
| 4,358,936 | 11/1982 | Ito et al. ............................. | 62/229 |
| 4,485,634 | 12/1984 | Yasuda et al. . | |
| 4,485,635 | 12/1984 | Sakano . | |
| 4,539,821 | 10/1985 | Tamura . | |
| 4,582,124 | 4/1986 | Yoshimi et al. ................. | 62/229 A |
| 4,633,675 | 1/1987 | Sato . | |

FOREIGN PATENT DOCUMENTS 0030549 3/1981 Japan ................................ 62/209
0053225 3/1984 Japan ................................ 62/209

Primary Examiner—William E. Wayner
Attorney, Agent, or Firm—Banner, Birch, McKie & Beckett

[57] ABSTRACT

A control device for a variable capacity compressor in an automotive air conditioning system includes a first temperature sensor disposed forward of the evaporator, a second temperature sensor disposed behind the evaporator and a third temperature sensor disposed at the outside of the automobile compartment. The control device compares the air temperatures detected by the sensors with predetermined temperatures, and controls the capacity of the compressor in accordance with the compared results.

16 Claims, 3 Drawing Sheets

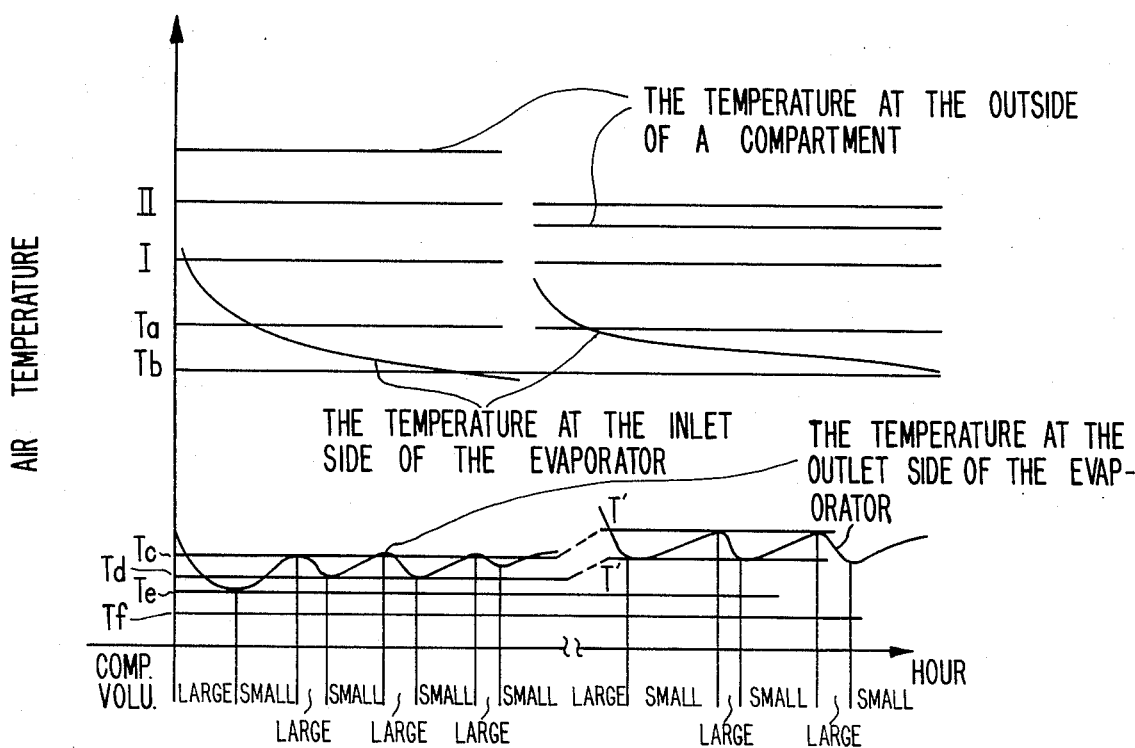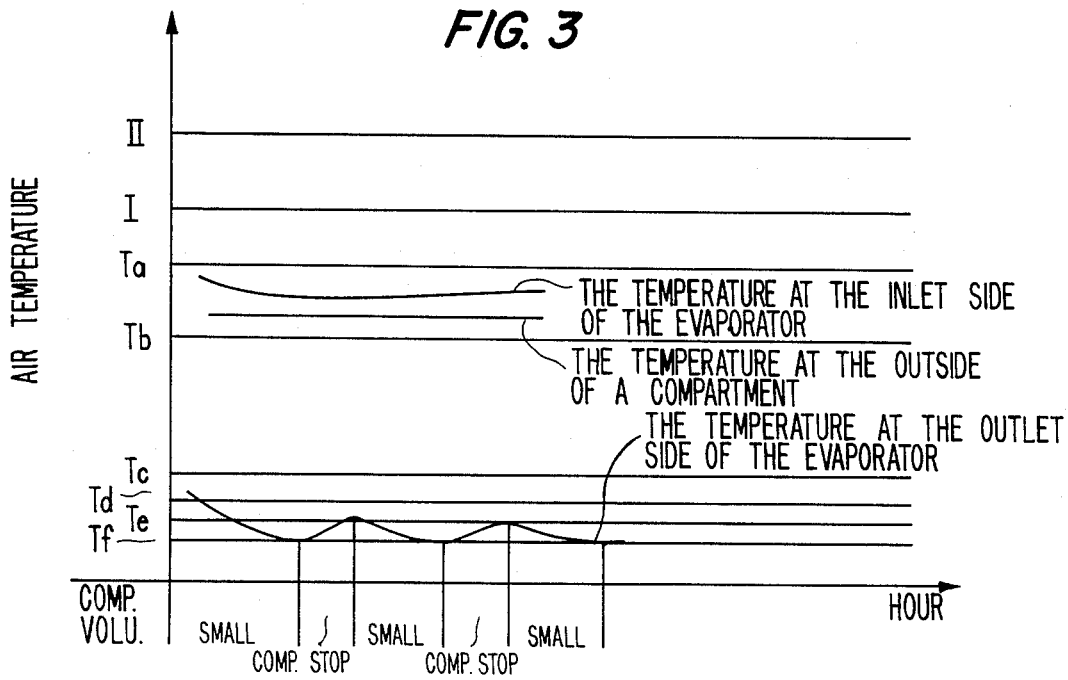

DEVICE FOR CONTROLLING THE CAPACITY OF A VARIABLE CAPACITY COMPRESSOR

TECHNICAL FIELD

The present invention relates to a device for controlling the capacity of a variable capacity compressor in an automobile air conditioning system, and more particularly, to a device which controls the capacity of the compressor in accordance with the air conditioning load.

BACKGROUND OF THE INVENTION

Generally, the air conditioning system of an automobile is driven by the vehicle engine through an electromagnetic clutch. The air conditioning system is designed to achieve a predetermined air conditioning performance at a predetermined air conditioning load when the automobile is driven at an average speed. Thus, when the vehicle engine is idling or is being driven at lower speeds, the rotational speed of the compressor is correspondingly low and the performance of the air conditioning system is adversely affected. On the other hand, when the vehicle is driven at high speeds, the rotational speed of the compressor is too high for efficient performance. Thus, electromagnetic clutches are used to control the rotational speed of the compressor under varying drive speeds by intermittently stopping and starting the compressor.

However, there are many problems associated with continuously cycling the clutch on and off. For example, when the engine is driven at high speeds and the capacity of the air conditioning system is large, it is necessary for the electromagnetic clutch to be turned on or off frequently. On the other hand, at low speeds or when the vehicle engine is idling, the compressor is not sufficiently driven to maintain the desired temperature in the vehicle.

In order to solve the abovementioned problems, a system which controls the capacity of a compressor by detecting the temperature at the outlet side of the air conditioning system evaporator is proposed in published Japanese Patent Application No. 58-30. In such a system, the performance of the air conditioning system is not directly detected. For example, even though the temperature in the inside of the vehicle may be high, the capacity of the air conditioning system is reduced when the temperature at the outlet side of the evaporator becomes lower than a predetermined temperature. Thus, the capacity of the system is insufficient to cool the vehicle. In addition, when the vehicle is running, the capacity of the air conditioning system is changed frequently, thereby placing great stress and strain on the air conditioning system.

SUMMARY OF THE INVENTION

It is a primary object of this invention to provide a device for controlling the capacity of a variable type compressor in an automotive air conditioning system in order to provide a more reliable and durable system than those known in the prior art.

The above object of the present invention is achieved by providing a control device which includes a first temperature detecting sensor disposed forward of the evaporator for detecting a first air temperature at the inlet side of the evaporator, a second temperature detecting sensor disposed behind the evaporator for detecting a second air temperature at the outlet side of the evaporator, a third temperature detecting sensor for detecting a third air temperature at the outside of the vehicle compartment, and a control unit. The control unit compares the detected air temperatures with predetermined temperatures and controls the capacity of the compressor in accordance with the compared results.

Further objects, features and advantages of this invention will be understood from the following detailed description of the preferred embodiments of the invention with reference to the attached drawings.

BRIEF DESCRIPTION OF THE DRAWINGS

FIG. 2 is a graph illustrating the relationship between a medium air conditioning load and a medium vehicle speed.

FIG. 3 is a graph illustrating the relationship between a low air conditioning load in air mixed mode.

DETAILED DESCRIPTION OF THE PREFERRED EMBODIMENT

Figure 1:
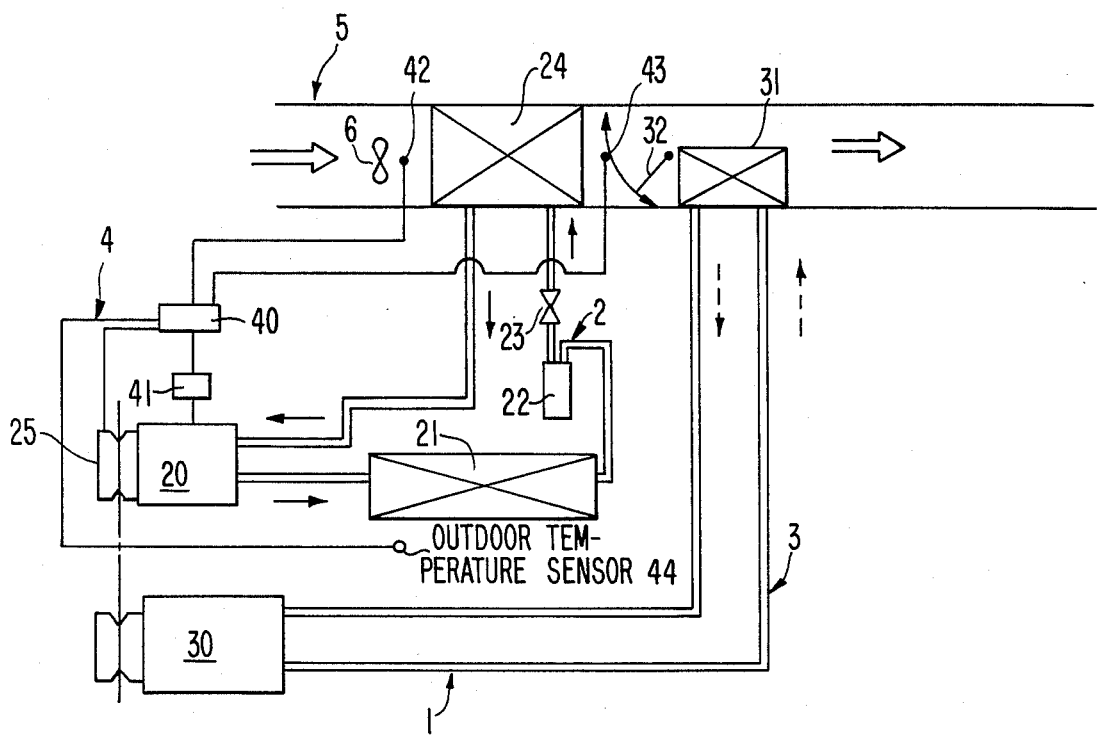
FIG. 1 is a block diagram of an air conditioning system in accordance with the present invention.

With reference to FIG. 1, there is shown an automotive air conditioning system which is driven by an engine 30. The air conditioning system comprises a compressor 20, a condenser 21, a receiver-dryer 22, an expansion valve 23 and an evaporator 24, each of which are serially connected to one another. Compressor 20 is driven by engine 30 and is a variable capacity compressor of the scroll type or swash plate type design. The capacity of compressor 20 can be varied by operating capacity control mechanism 41 responsive to a signal from control unit 40. If compressor 20 is of the scroll type, capacity changing mechanism 41 comprises an electromagnetic bypass valve which connects the inlet of the compressor to the intermediate fluid pockets through an intermediate chamber as shown in U.S. Pat. No. 4,468,178. The operation of compressor 20 is also controlled by electromagnetic clutch 25 mounted on compressor 20 which operates responsive to signals from control unit 40.

As shown in FIG. 1, evaporator 24 is disposed in duct 5. A first sensor 42 is disposed at the inlet side of evaporator 24 and a second sensor 43 is disposed at the outlet side of evaporator 24. In addition, a third sensor 44 is disposed at the exterior of the automotive. Sensor 42, 43 and 44 are connected to control unit 40. Control unit 40 compares the detected temperature values with predetermined values and then sends appropriate capacity control signals to capacity control mechanism 41 to effect a change in the capacity of the compressor or to start or stop the operation of the compressor 20 through operation of electromagnetic clutch 25.

A heater 31 disposed in duct 5 is connected to engine 30 and receives coolant from engine 30 for heating the vehicle when the outside temperature is cold. A damper 32 disposed forward of heater 31 controls the temperature of the discharged air by the angle of its opening being controlled. Blower 6 is disposed forward of evaporator 24, so that the air introduced into duct 5 is forced through the duct by blower 6 and discharged into the automobile compartment.

Figure 4:
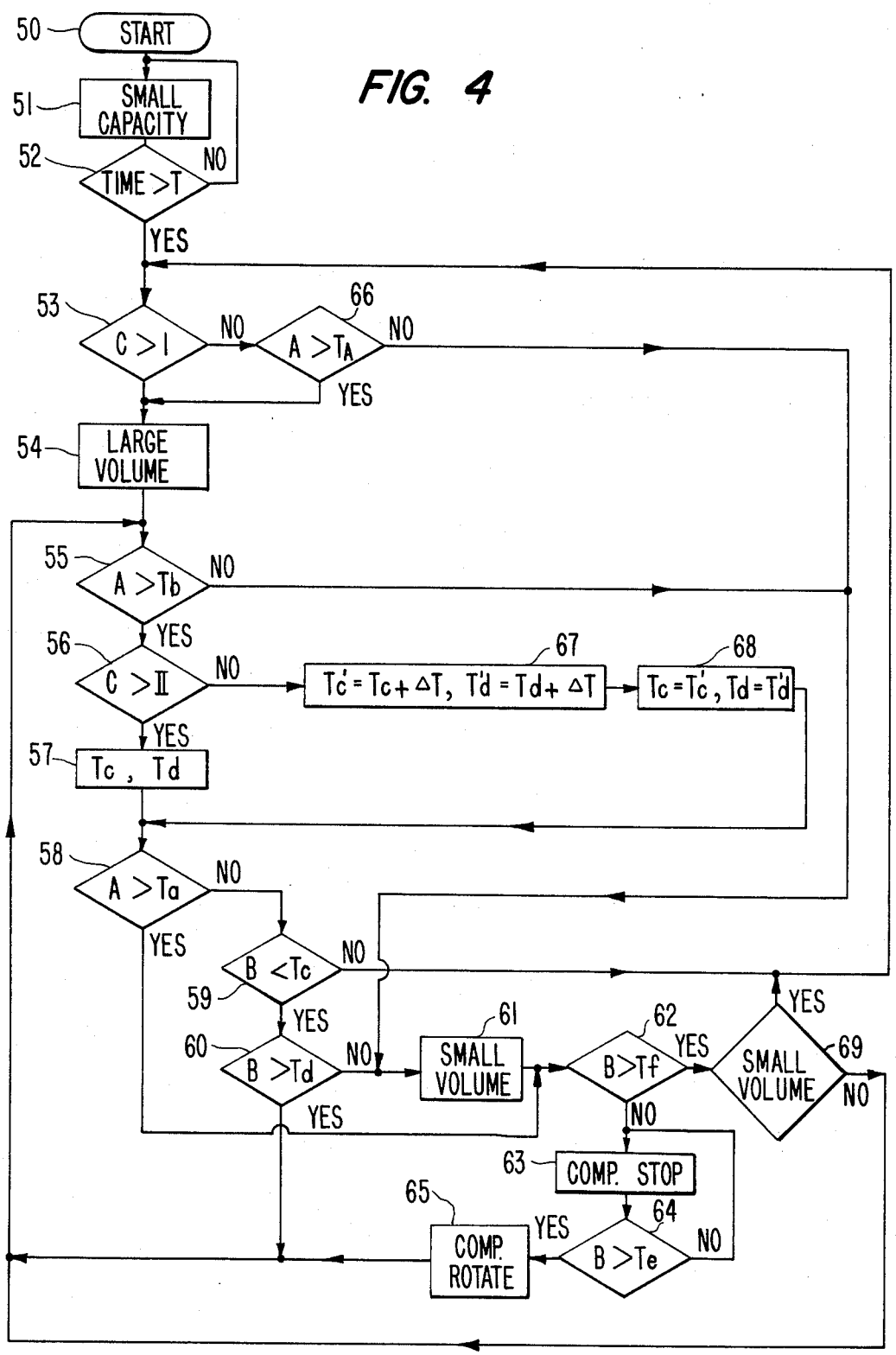
FIG. 4 is a flowchart illustrating the operation of the control system of the present invention.

With reference to FIG. 4, there is shown a flowchart which illustrates the operation of control unit 40.

When the air conditioning system is turned on in step 50, compressor 20 is operated at a predetermined small capacity (step 51). After the air conditioning system is operated for a predetermined time T (step 52), control passes to step 53.

At step 53 the air temperature C at the outside of the compartment is compared to a first predetermined temperature I. If air temperature C is higher than predetermined temperature I, control first passes to step 54 where capacity control mechanism 41 is controlled to operate compressor 20 at a large volume and control then passes to step 55. Otherwise, if air temperature C is lower than the predetermined temperature I, control passes to step 66 where the air temperature A at the inlet side of evaporator 24 is compared to a second predetermined temperature Ta. If air temperature A is higher than predetermined temperature Ta, step 54 is executed, i.e., compressor 20 is operated at a large volume. Otherwise, if air temperature A is lower than predetermined temperature Ta, control passes to step 61 where capacity control mechanism 41 is set to operate compressor 20 at a small volume and control then passes to step 62.

At step 55, air temperature A is compared to a third predetermined temperature Tb. If air temperature A is higher than predetermined temperature Tb, control passes to step 56. Otherwise, if air temperature A is lower than predetermined temperature Tb, control passes to step 61 where capacity control mechanism 41 is set to operate compressor 20 at a small volume and control then passes to step 62.

At step 56, the air temperature C at the exterior of the vehicle is compared to a fourth predetermined temperature II. If air temperature C is higher than predetermined temperature II, control passes to step 57 where fifth predetermined temperature Tc is set to a first temperature value and sixth predetermined temperature Td is set to a second temperature value. Otherwise, control passes to steps 67 and 68 where predetermined temperature Tc is set to a third temperature value higher than the first temperature value and predetermined temperature Td is set to a fourth temperature value, higher than the second temperature value.

After either step 57 or steps 67 and 68 are executed, control passes to step 58 where air temperature A is compared to second predetermined temperature Ta. If air temperature A is higher than predetermined temperature Ta, control passes to step 62. Otherwise, control passes to step 59 where the air temperature B at the outlet side of evaporator 24 is compared to fifth predetermined temperature Tc. If air temperature B is less than predetermined temperature Tc, control passes to step 60. Otherwise, control returns to step 53.

At step 60, air temperature B is compared to sixth predetermined temperature Td. If air temperature B is lower than predetermined temperature Td, control passes to step 61 where capacity control mechanism 41 is set to operate compressor 20 at a small volume and control is then passd to step 62. Otherwise, control returns to step 55.

At step 62, air temperature B is compared to a seventh predetermined temperature Tf. If air temperature B is higher than predetermined temperature Tf, control passes to step 69 where a determination is made as to whether compressor 20 is being operated at a small volume. If compressor 20 is being operated at a small volume, control returns to step 53. Otherwise, control returns to step 55.

If air temperature B is not higher than predetermined temperature Tf, control passes from step 62 to step 63 where the operation of compressor 20 is stopped. Then, step 64 is executed to compare air temperature B to eighth predetermined temperature Te. If air temperature B is higher than predetermined temperature Te, control passes to step 65 where compressor 20 is restarted, and control is returned to step 55. Otherwise, i.e., if air temperature B is lower than predetermined temperature Te, control is returned to step 63, and compressor 20 remains halted until air temperature B exceeds predetermined temperature Te.

It will be easily understood by those skilled in the art that in the present invention, changes to the volume of compressor 20 are not confined to two values only, i.e., a large capacity and a small capacity, but may include various intermediate capacities as well. In addition, it should be understood that though fifth predetermined temperature Tc must be higher than sixth predetermined temperature Td and eighth predetermined temperature Te must be higher than seventh predetermined temperature Tf, the maximum value of each of the fifth, sixth, seventh and eighth predetermined temperatures is not defined.

Referring to FIG. 2, there is shown a graph illustrating changes, over time, in the air temperature B at the outlet side of evaporator 24 in relation to compressor volume, air temperature A at the inlet side of evaporator 24, and air temperature C at the outside of a vehicle compartment.

When air temperature A at the inlet side of evaporator 24 is higher than second predetermined temperature Ta, the compression volume of compressor 20 is maintained at a large capacity. When air temperature A at the inlet side of evaporator 24 is lower than third predetermined temperature Tb, the compression volume of compressor 20 is changed to a small capacity. Further, when air temperature A is within the range between predetermined temperature Ta and predetermined temperature Tb, the compression volume of compressor 20 is controlled in accordance with the air temperature B at the outlet side of evaporator 24.

When air temperature C at the outside of the compartment is within the range between predetermined temperatures I and II, predetermined temperatures Tc, Td are increased in value. Thus, the proportion of operation of the compressor at a small compression volume to that at a large volume is increased.

FIG. 3 illustrates operation of the variable control over time when the air conditioning load is low. In this example, air temperature A at the inlet side of evaporator 24 is controlled so as to be higher than air temperature C at the outside of the compartment.

When air temperature C is lower than predetermined temperature I and air temperature A at the inlet side of evaporator 24 is lower than predetermined temperature Ta, the compression volume of compressor 20 is maintained at a small capacity. If air temperature B at the outlet side of evaporator 24 falls below predetermined temperature Tf, operation of the compressor is stopped by deactivating electromagnetic clutch 25 mounted on compressor 20. When air temperature B is higher than predetermined temperature Te, electromagnetic clutch 25 is activated so that compressor 20 is turned on and operates at a small compression volume.

This invention has been described in detail in connection with preferred embodiments. These embodiments are examples only and the invention is not restricted thereto. It will be easily understood by those skilled in the art that variations and modifications can be made to the invention within the scope of the appended claims.

I claim:

1. A device for controlling the capacity of a variable capacity compressor in an automobile air conditioning system having an evaporator and compressor capacity changing means, said device comprising;

first temperature detecting means disposed forward of said evaporator for detecting a first air temperature at the inlet side of said evaporator;

second temperature detecting means disposed behind said evaporator for detecting a second air temperature at the outlet side of said evaporator;

third temperature detecting means disposed at the outside of the automobile compartment for detecting a third air temperature at the outside of the compartment; and control means for controlling said compressor capacity changing means, said control means including;

first comparison means for comparing a first predetermined temperature with said third air temperature and providing a first control signal when said third air temperature is higher than said first predetermined temperature, wherein said capacity changing means changes the capacity of said compressor to a large capacity in response to said first control signal;

second comparison means for comparing a second predetermined temperature with said first air temperature in response to the comparison by said first comparison means and the absence of said first control signal, said second comparison means providing a second control signal when said first air temperature is higher than said second predetermined temperature, wherein in response to said second control signal, said capacity changing means changes the capacity of said compressor to a large capacity and in the absence of said second control signal, said capacity chaning means changes the capacity of said compressor to a small capacity, third comparison means for comparing a third predetermined temperature with said first air temperature and providing a third control signal when said first air temperature is higher than said third predetermined temperature, wherein said capacity changing means changes the capacity of said compressor to a small capacity in the absence of said third control signal, fourth comparison means for comparing a fourth predetermined temperature with said third air temperature in response to the comparison by said third comparison means and the presence of said third control signal and providing a fourth control signal when said third air temperature is higher than said fourth predetermined temperature, wherein in response to said fourth control signal, a fifth predetermined temperature is set to a first temperature and a sixth predetermined temperature is set to a second temperature and in the absence of said fourth control signal, said fifth predetermined temperature is set to a third temperature and said sixth predetermined temperature is set to a fourth temperature, fifth comparison means for comparing said second predetermined temperature with said first air temperature and providing a fifth control signal when said first air temperature is higher than said second predetermined temperature, sixth comparison means for comparing said fifth predetermined temperature with said second air temperature in response to the comparison by said fifth comparison means and the absence of said fifth control signal, said sixth comparison means providing a sixth control signal when said fifth predetermined temperature is higher than said second air temperature, seventh comparison means for comparing said sixth predetermined temperature with said second air temperature in response to the comparison by said sixth comparison means and the presence of said sixth control signal, said seventh comparison means providing a seventh control signal when said second air temperature is higher than said sixth predetermined temperature, wherein said capacity changing means changes the capacity of the compressor to a small capacity in the absence of said seventh control signal, eighth comparison means for comparing a seventh predetermined temperature with said second air temperature and providing an eighth control signal when said second air temperature is higher than said seventh predetermined temperature, wherein the compressor is turned off in the absence of said eighth control signal, ninth comparison means for comparing an eighth predetermined temperature with said second air temperature in response to the comparison by said eighth comparison means and the absence of said eighth control signal, said ninth comparison means providing a ninth control signal when said second air temperature is higher than said eighth predetermined temperature, wherein in response to said ninth control signal, said compressor is turned on and in the absence of said ninth control signal, said compressor is turned off.

2. The device of claim 1 wherein said control means further includes determination means for determining whether said compressor is being operated at a small capacity, said determination means providing a tenth control signal when said compressor is being operated at a small capacity.

3. The device of claim 2 wherein in response to a determination by said determination means and the presence of said tenth control signal, said first comparison means is controlled to compare said first predetermined temperature and said third air temperature.

4. The device of claim 2 wherein in response to a determination by said determination means and the absence of said tenth control signal, said third comparison means is controlled to compare said third predetermined temperature and said first air temperature.

5. The device of claim 1 wherein in response to the comparison by said fifth comparison means and the presence of said fifth control signal said eight comparison means is controlled to compare said seventh predetermined temperature and said second air temperature.

6. The device of claim 1 wherein in response to the comparison by said sixth comparison means and the absence of said sixth control signal said first comparison means is controlled to compare said first predetermined temperature and said third air temperature.

7. The device of claim 1 wherein in response to the comparison by said seventh comparison means and the presence of said seventh control signal, said third comparison means is controlled to compare said third predetermined temperature and said first air temperature.

8. The device of claim 1 wherein in response to the comparison by said ninth comparison means and the presence of said ninth control signal said third comparison means is controlled to compare said third predetermined temperature and said first air temperature.

9. In a variable capacity compressor for an automobile air conditioning system having an evaporator and compressor capacity changing means, a method for controlling the capacity changing means comprising the steps of:

detecting a first air temperature at the inlet side of said evaporator;

detecting a second air temperature at the outlet side of said evaporator;

detecting a third air temperature at the outside of the automobile compartment;

comparing a first predetermined temperature with said third air temperature, providing a first control signal when said third air temperature is higher than said first predetermined temperature, and controlling said capacity changing means to change the capacity of said compressor to a large capacity in response to said first control signal;

comparing a second predetermined temperature with said first air temperature in response to the absence of said first control signal, providing a second control signal when said first air temperature is higher than said second predetermined temperature, and in response to said second control signal, controlling said capacity changing means to change the capacity of said compressor to a large capacity and in the absence of said second control signal, controlling said capacity changing means to change the capacity of said compressor to a small capacity, comparing a third predetermined temperature with said first air temperature, providing a third control signal when said first air temperature is higher than said third predetermined temperature, and controlling said capacity changing means to change the capacity of said compressor to a small capacity in the absence of said third control signal, comparing a fourth predetermined temperature with said third air temperature in response to the presence of said third control signal, providing a fourth control signal when said third air temperature is higher than said fourth predetermined temperature, and in response to said fourth control signal, setting a fifth predetermined temperature to a first temperature and setting a sixth predetermined temperature to a second temperature and in the absence of said fourth control signal, setting said fifth predetermined temperature to a third temperature and setting said sixth predetermined temperature to a fourth temperature, comparing said second predetermined temperature with said first air temperature and providing a fifth control signal when said first air temperature is higher than said second predetermined temperature, comparing said fifth predetermined temperature with said second air temperature in response to the absence of said fifth control signal, and providing a sixth control signal when said fifth predetermined temperature is higher than said second air temperature, comparing said sixth predetermined temperature with said second air temperature in response to the presence of said sixth control signal, providing a seventh control signal when said second air temperature is higher than said sixth predetermined temperature, and controlling said capacity changing means to change the capacity of the compressor to a small capacity in the absence of said seventh control signal, comparing a seventh predetermined temperature with said second air temperature, providing an eighth control signal when said second air temperature is higher than said seventh predetermined temperature, and controlling said capacity changing means to stop the operation of the compressor in the absence of said eighth control signal, comparing an eighth predetermined temperature with said second air temperature in response to the absence of said eighth control signal, providing a ninth control signal when said second air temperature is higher than said eighth predetermined temperature, controlling said capacity changing means to start operation of said compressor in response to said ninth control signal and controlling said capacity changing means to stop operation of the compressor in the absence of said ninth control signal.

10. The method of claim 9 further including the step of determining whether said compressor is being operated at a small capacity, and providing a tenth control signal when said compressor is being operated at a small capacity.

11. The method of claim 10 further including the step of responding to the presence of said tenth control signal by comparing said first predetermined temperature and said third air temperature.

12. The method of claim 10 further including the step of responding to the absence of said tenth control signal by comparing said third predetermined temperature and said first air temperature.

13. The method of claim 9 further including the step of responding to the presence of said fifth control signal by comparing said seventh predetermined temperature and said second air temperature.

14. The method of claim 9 further including the step of responding to the absence of said sixth control signal by comparing first predetermined temperature and said third air temperature.

15. The method of claim 9 further including the step of responding to the presence of said seventh control signal by comparing said third predetermined temperature and said first air temperature.

16. The method of claim 9 further including the step of responding to the presence of said ninth control signal by comparing said third predetermined temperature and said first air temperature.

* * * * *